US010474212B2

(12) United States Patent
DiSessa

(10) Patent No.: US 10,474,212 B2
(45) Date of Patent: Nov. 12, 2019

(54) PROCESS AND HARDWARE FOR PROACTIVELY PROTECTING COMPUTERS AND MOBILE DEVICES AGAINST BAD WEATHER

(71) Applicant: William G. DiSessa, Holly, MI (US)

(72) Inventor: William G. DiSessa, Holly, MI (US)

( * ) Notice: Subject to any disclaimer, the term of this patent is extended or adjusted under 35 U.S.C. 154(b) by 0 days.

(21) Appl. No.: 15/723,009

(22) Filed: Oct. 2, 2017

(65) Prior Publication Data
US 2019/0187768 A1    Jun. 20, 2019

(51) Int. Cl.
G06F 1/28 (2006.01)
G06F 11/14 (2006.01)
G06F 1/26 (2006.01)

(52) U.S. Cl.
CPC ............... G06F 1/28 (2013.01); G06F 1/263 (2013.01); G06F 1/266 (2013.01); G06F 11/1441 (2013.01)

(58) Field of Classification Search
None
See application file for complete search history.

(56) References Cited

U.S. PATENT DOCUMENTS

| 6,104,582 A  * | 8/2000  | Cannon   | G06F 1/26 361/1 |
| 7,088,254 B2 * | 8/2006  | Liebenow | G01W 1/10 340/539.1 |
| 8,044,810 B2 * | 10/2011 | Delia    | G01W 1/00 340/601 |
| 8,487,765 B1 * | 7/2013  | Jordan, II | G06F 1/266 307/116 |

* cited by examiner

Primary Examiner — Daniel Swerdlow

(57) ABSTRACT

One embodiment of system that proactively protects computers from storm-related electrical damage. System includes chassis housing microchip and circuitry; software application installed on computer; and cloud-based server. Server scans online weather services for local weather alerts. When server sends alert to software application, based on computer location, application turns computer off and wirelessly instructs chassis to disconnect computer from power supply—before storm arrives. One embodiment uses a hub-and-spoke workflow that periodically scans once and routes alerts to users' software applications in affected locations only. Protection system scans every few minutes so even fast-moving storms are not missed, yet system neither overloads weather service servers nor incurs excessive usage fees. System also protects other appliances with wireless connectivity. Improvement to other known systems which: scan for alerts for users individually; omit a scanning process; or turn computers off or disconnect them from power supplies, but typically not both.

20 Claims, 14 Drawing Sheets

Response Fields for cities within the USA

| type | Translated |
|------|------------|
| HUR | Hurricane Local Statement |
| TOR | Tornado Warning |
| TOW | Tornado Watch |
| WRN | Severe Thunderstorm Warning |
| SEW | Severe Thunderstorm Watch |
| WIN | Winter Weather Advisory |
| FLO | Flood Warning |
| WAT | Flood Watch / Statement |
| WND | High Wind Advisory |
| SVR | Severe Weather Statement |
| HEA | Heat Advisory |
| FOG | Dense Fog Advisory |
| SPE | Special Weather Statement |
| FIR | Fire Weather Advisory |
| VOL | Volcanic Activity Statement |
| HWW | Hurricane Wind Warning |
| REC | Record Set |
| REP | Public Reports |
| PUB | Public Information Statement |

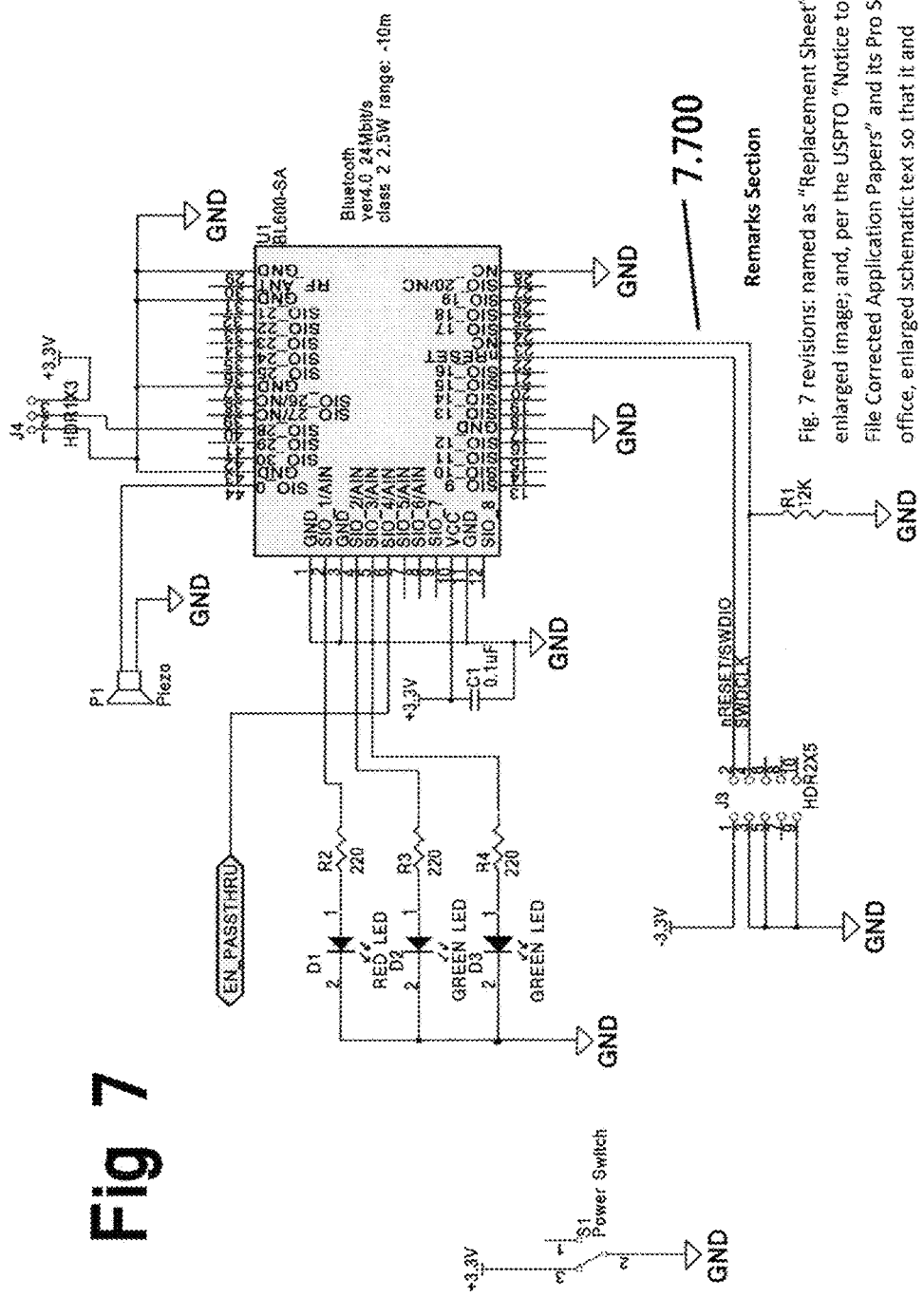

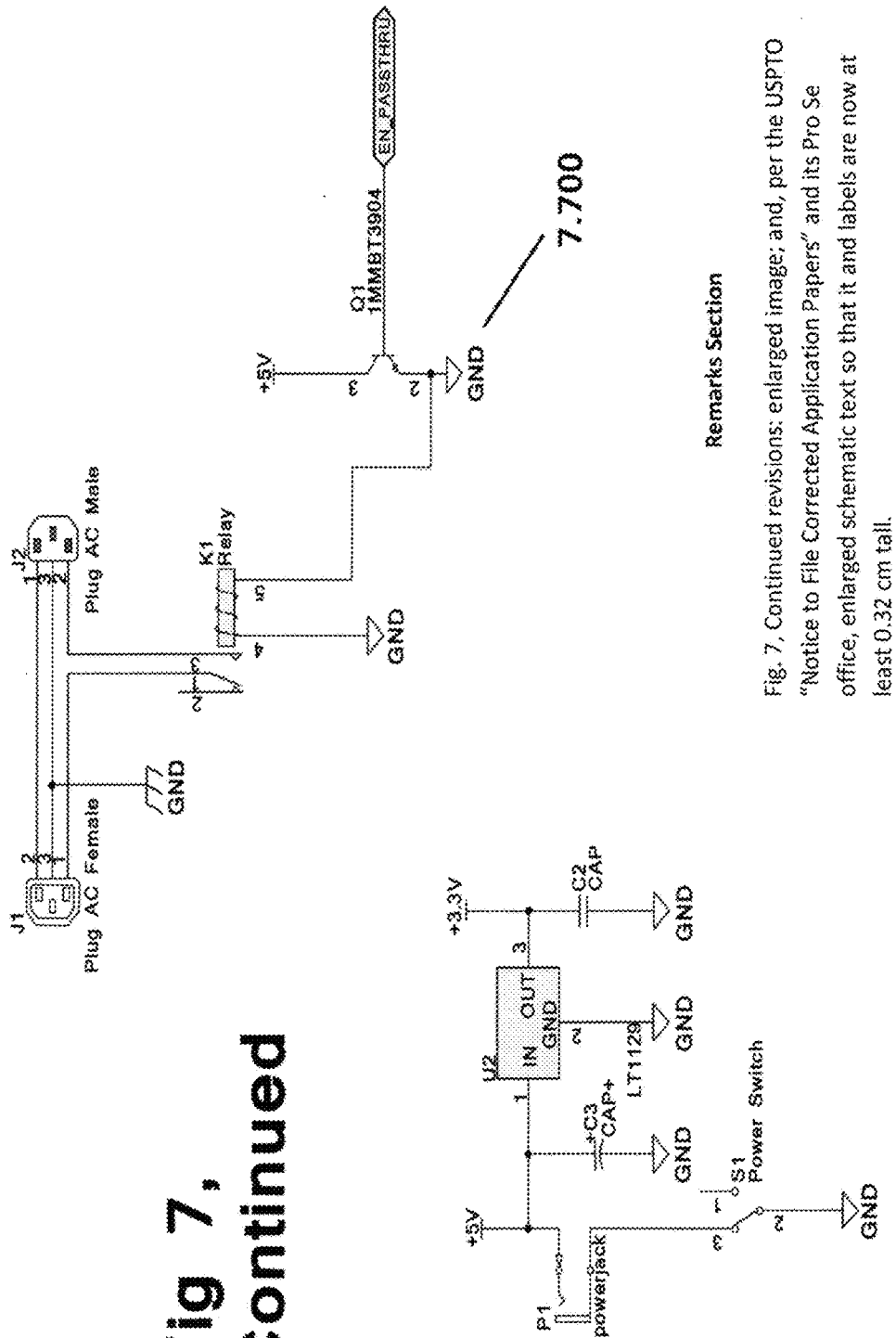

Remarks Section

Fig. 8 revisions: designated as a "Replacement Sheet"; enlarged image; removed feint background; and, per the USPTO "Notice to File Corrected Application Papers" and its Pro Se office, enlarged schematic text so that it and labels are now at least 0.32 cm tall.

PROCESS AND HARDWARE FOR PROACTIVELY PROTECTING COMPUTERS AND MOBILE DEVICES AGAINST BAD WEATHER

CROSS-REFERENCE TO RELATED APPLICATIONS

This application claims the benefits of provisional patents Ser. No. 62/006,152, filed 2014 May 31, and Ser. No. 62/092,218, filed Dec. 15, 2014 by the present inventor and continuation-in-part of application Ser. No. 14/726,193, filed May 29, 2015.

TECHNICAL FIELD

The present disclosure generally relates to a process or software application and a hardware chassis which combine to automatically shut down and turn computers, entertainment and appliances by using weather alerts issued by weather services.

BACKGROUND

Surge protectors are known protect computers and appliances from electrical problems such as power surges and outages. Such events, often caused by severe weather can destroy computers. This especially is so when the machines are plugged into a wall electrical outlet. Even with surge protectors in place, computers are at-risk during certain weather conditions, such as lightning strikes, regardless of whether they are turned on or off. For instance, a direct lightning can strike a building, run along an electrical power line to a power outlet, bypass or defeat a surge protector, and destroy a computer motherboard. Therefore, it is generally accepted that the best way to protect computers from weather-related electrical problems is to manually turn them off and to unplug or disconnect them from their power sources.

SUMMARY

In one embodiment, the present invention comprises a protection system for automatically protecting at least one electrical device from weather related events, the protection system comprising: one or more source configured to deliver AC voltage via a wired connection to at least one electrical device; at least one receiver configured to receive a weather alert signal from a weather service, wherein the received weather alert signal includes data indicative of a weather event; at least one control functionally coupled to the one or more source and the receiver; a memory and a processor, wherein the control is functionally coupled to the processor and the memory, wherein the memory stores instructions, wherein the instructions are configured to cause the control to automatically disconnect the wired connection to the at least one electrical device after the receiver receives the weather alert data; a first timer configured to delay the disconnection of the wired connection by a period of time determined by a value. In one embodiment, the value is determined by the data or a user of the at least one electrical device. In one embodiment, the system further comprises a second timer, wherein the second timer is configured to initiate shutdown of the at least one electrical device before the period of time has elapsed. In one embodiment, the instructions comprise the first and/or the second timer. In one embodiment the instructions comprise hardware functionally connected to the processor. In one embodiment, the shutdown of the at least one electrical device occurs before the period of time has elapsed. In one embodiment, the system further comprises a switch configured to receive a signal from the control and to cause the disconnection of the wired connection. In one embodiment, the at least one electrical device is selected from the group comprised of a computer, an appliance, and an entertainment device. In one embodiment, the system further comprises a DC power source configured to provide power to the at least one control or the at least one electrical device during disconnection of the wired connection. In one embodiment, the at least one control or the at least one electrical device is configured to automatically reconnect the wired connection to the at least one electrical device upon conclusion of the weather related event. In one embodiment, the system further comprises a hub-and-spoke polling system, wherein the hub receives the weather alert signal from the weather service and distributes the signal to the at least one device so as to minimize weather service bandwidth and server usage by the at least one device. In one embodiment, the weather event comprises a thunderstorm, a tornado, or a hurricane. In one embodiment, the system comprises the at least one electrical device, and wherein the at least one device comprises at least one of the at least one receiver and the instructions. In one embodiment, the system further comprises a housing, wherein the housing is comprised of the receiver, the control, and the one or more source. In one embodiment, the data is also indicative of a location of the weather event.

In one embodiment, the present invention comprises a method for automatically protecting at least one electrical device from weather related events, the method comprising the steps of: connecting at least one electrical device to one or more source of AC power via a wired connection; receiving a weather alert signal from a weather service with a receiver, wherein the alert signal is includes data indicative of a weather event and a location of the weather event; upon the receipt of the weather alert signal, waiting a period of time determined by a timer; after waiting the period of time, automatically disconnecting the wired connection between the at least one electrical device and the one or more power source. In one embodiment, the method further comprises a step of automatically shutting down the at least one electrical device before the end of the period of time. In one embodiment, the method comprises providing DC power to the at least one device after or at the time of disconnecting the wired connection. In one embodiment, the method further comprises automatically reconnecting the wired connection to the at least one electrical device upon conclusion of the weather alert signal. In one embodiment, the method further comprises receiving the weather alert signal from a cloud based hub and distributing the signal from the hub to the at least one electrical device so as to minimize weather service bandwidth and server usage.

In one embodiment, the present invention comprises a protection device for automatically protecting at least one electrical device from weather related events, the protection system comprising: one or more source configured to deliver AC voltage via a wired connection to at least one electrical device; at least one receiver configured to receive a weather alert signal from a weather service, wherein the received weather alert signal includes data indicative of a weather event and a location of the weather event; at least one control coupled to the one or more source and the receiver; wherein the control is configured to automatically disconnect the wired connection to the at least one electrical device after the receiver receives the weather alert data; a first timer configured to delay the disconnection of the wired connection by a period of time determined by a value; and a second timer, wherein the second timer is configured to initiate shutdown of the at least one electrical device before an end of the delay. In one embodiment, the device further comprises a DC power source configured to provide power to the at least one control or at least one electrical device during disconnection of the wired connection; and wherein the control or at least one electrical device is configured to automatically reconnect the wired connection to the at least one electrical device upon conclusion of the weather related event.

The present invention further includes timing and synchronization functions that turn off computers and disconnect them from sources of power, while also giving users, if present, the option to cancel shutdowns or shut down their computers immediately. In one embodiment, a chassis includes a switch that disconnects devices from their powers sources. In some embodiments, a user may restore power to the computer by pressing a reset button on the chassis. In further embodiments, the present invention automatically restores power to the computer and turns it back on, following a computer shutdown and power disconnection due to a local weather alert. In one embodiment that uses a hub-and-spoke and cloud-based polling system, the present invention avoids overloading weather service servers and the excess usage fees and restrictions that may be incurred that may result from excessive polling volume and frequency by a large number of devices protected by the present invention.

In one embodiment, the present invention disconnects mobile devices from the power supply when severe weather threatens, but does not first turn them off when the Terms of Service (TOS) of the mobile devices does not allow external applications to remotely shut them down. If Apple and Android lift this restriction, this invention software could extend protection to these mobile devices, first turning them off and then disconnecting them from the power supply, as occurs with desktop and portable computers. In some embodiments, the chassis can include the added functionality of monitoring a recharging process and stopping this process once a mobile device is 100-percent fully charged. Then, if a power outage occurs, the user has use of one or more fully charged mobile devices.

In other embodiments, when severe weather threatens a surrounding area, a process or software application for Windows, Macs and Linux operating systems shuts down computers after wirelessly commanding a chassis control circuit to disconnect power to the computer, thereby proactively avoiding data loss, device damage or destruction. Shutting down and disconnecting devices from their power source are preferred ways to protect the devices from storm-related electrical damage.

In one embodiment, an internal relay or "pass-thru" switch in the circuitry of the present invention allows power to pass through to a connected computer when it is turned back on by the user. In some embodiments, a user presses a reset button on the chassis to allow power to pass through to turn the computer back on. In one embodiment, the internal relay or pass-through switch function allows power to be restored manually by a user operated reset button, by the computer automatically at the command of the present invention software's cloud-based component or, in further embodiments, via a mobile device application for this invention.

In other embodiments, a mobile device application can be used to turn the computer back on. Once the computer is turned back on, the process—which involves shutting down the computer, disconnecting power to it, and then reconnecting power and re-starting the computer—repeats until the severe weather leaves the area and no more alerts are triggered, or the user manually turns off the computer.

In one embodiment, the present invention uses two timers or counters to control and synchronize a shutdown and power disconnection processes. In embodiment, the timers or counters can be implemented in software, hardware, and or firmware. When control software detects a local weather alert, it launches shutdown timer embodied with a first value that when reached, causes an electrical connection between a device being protected and a source of power to be physically disconnected. A second, timer or counter embodies a shorter second value than the first counter to allow the device to be protected to shut down or go into standby safely, for example, as may be required to save data on a computer without losing it. In one embodiment, the second value is 20 seconds and the first value is 3 minutes, but other values are also within the scope of the present invention.

Thus, the present invention provides proactive, automatic and remote protection for desktop and plugged in portable computers whether a user is present or not. The software allows users to enter their locations to receive local weather alerts and to adjust the settings for which weather alerts to receive and how many minutes to wait between polling for weather alerts.

DRAWINGS—FIGURES

FIG. 2 illustrates a typical online weather service application programming interface (API), including codes identifying various weather events (e.g., severe thunderstorm warning), which some embodiments used as keys to shut down computers at risk of storm-related electrical damage.

Figure 3:
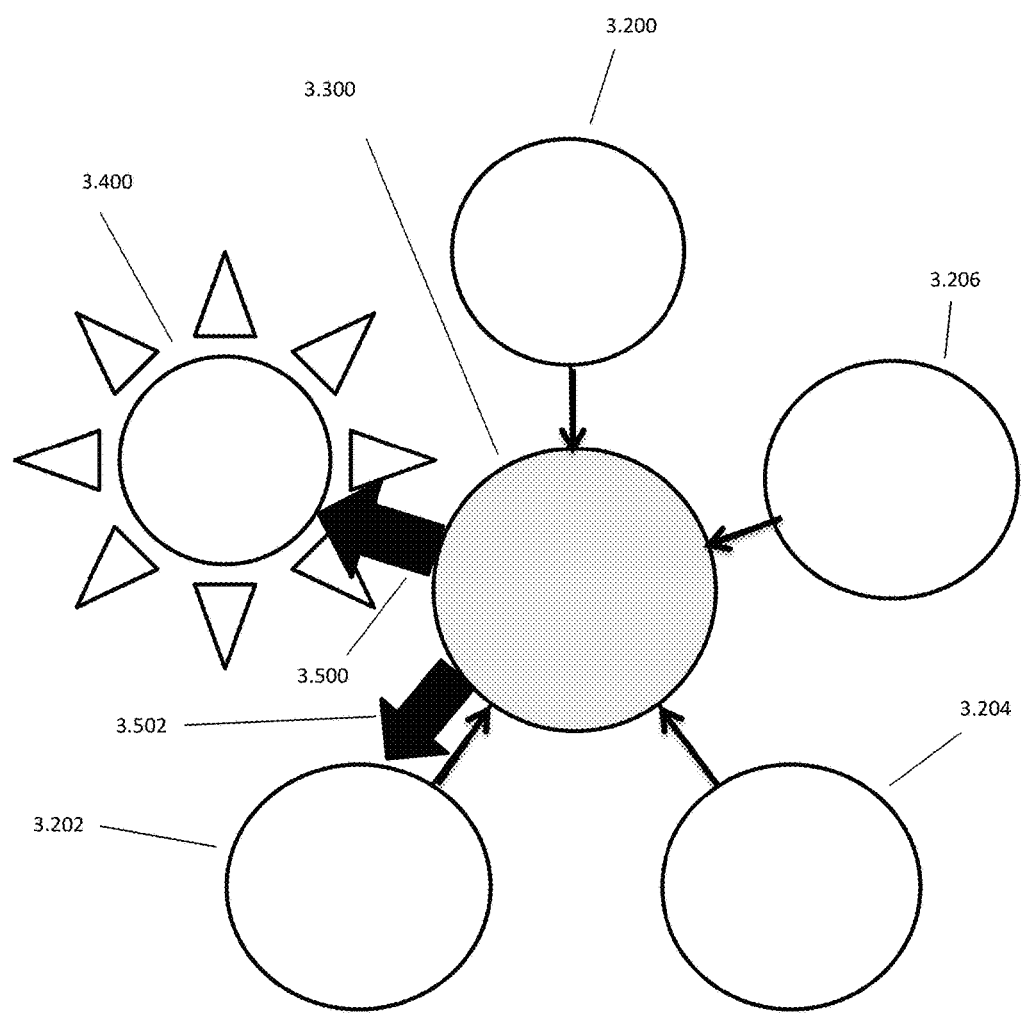

FIG. 3 provides a perspective of some embodiments' hub-and-spoke design.

Figure 4:
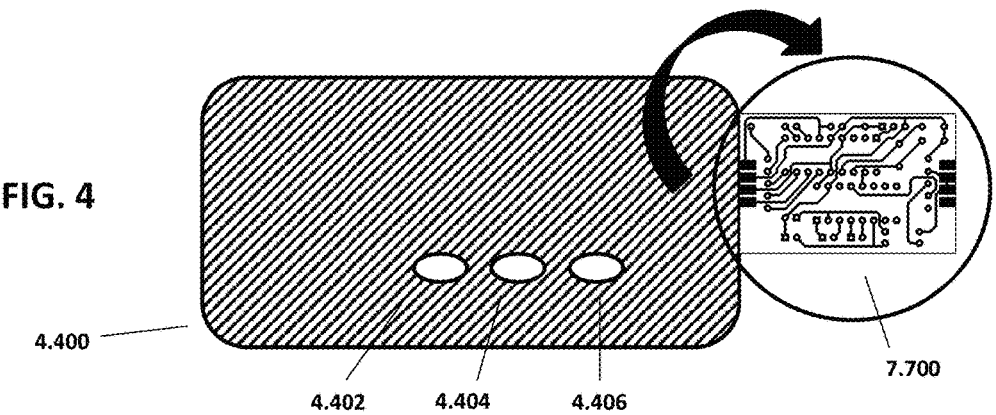

FIG. 4 is a front view of some embodiments' chassis.

Figure 5:
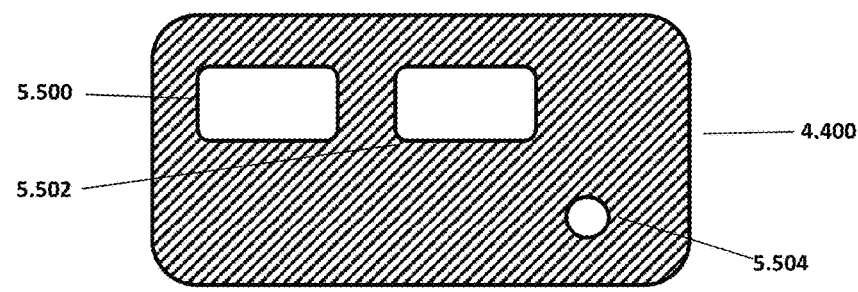

FIG. 5 is a rear view of some embodiments' chassis.

Figure 6:
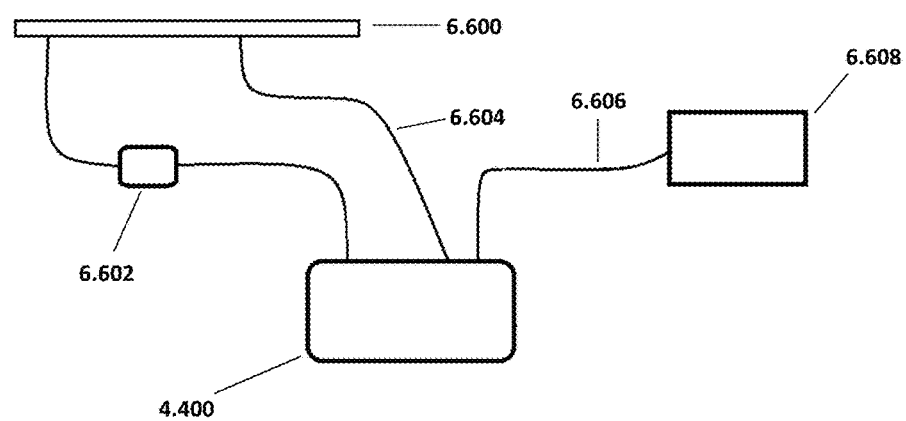

FIG. 6 is a perspective view of some embodiments' chassis.

FIG. 7 is an overview of the electrical schematics of some embodiments' chassis.

Figure 8:
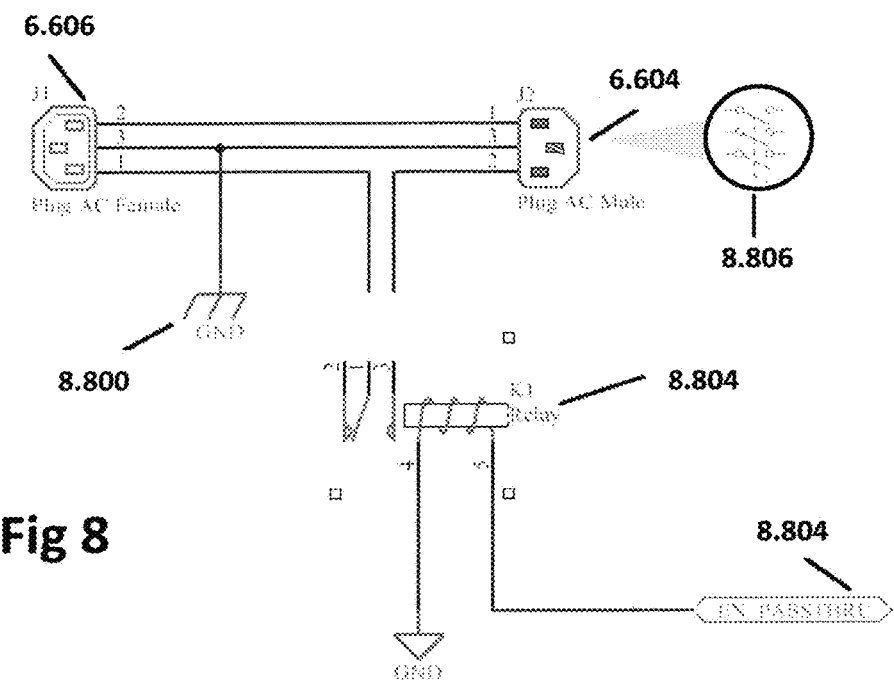

FIG. 8 is a detailed description of the electrical schematics of some embodiments' chassis.

Figure 9:
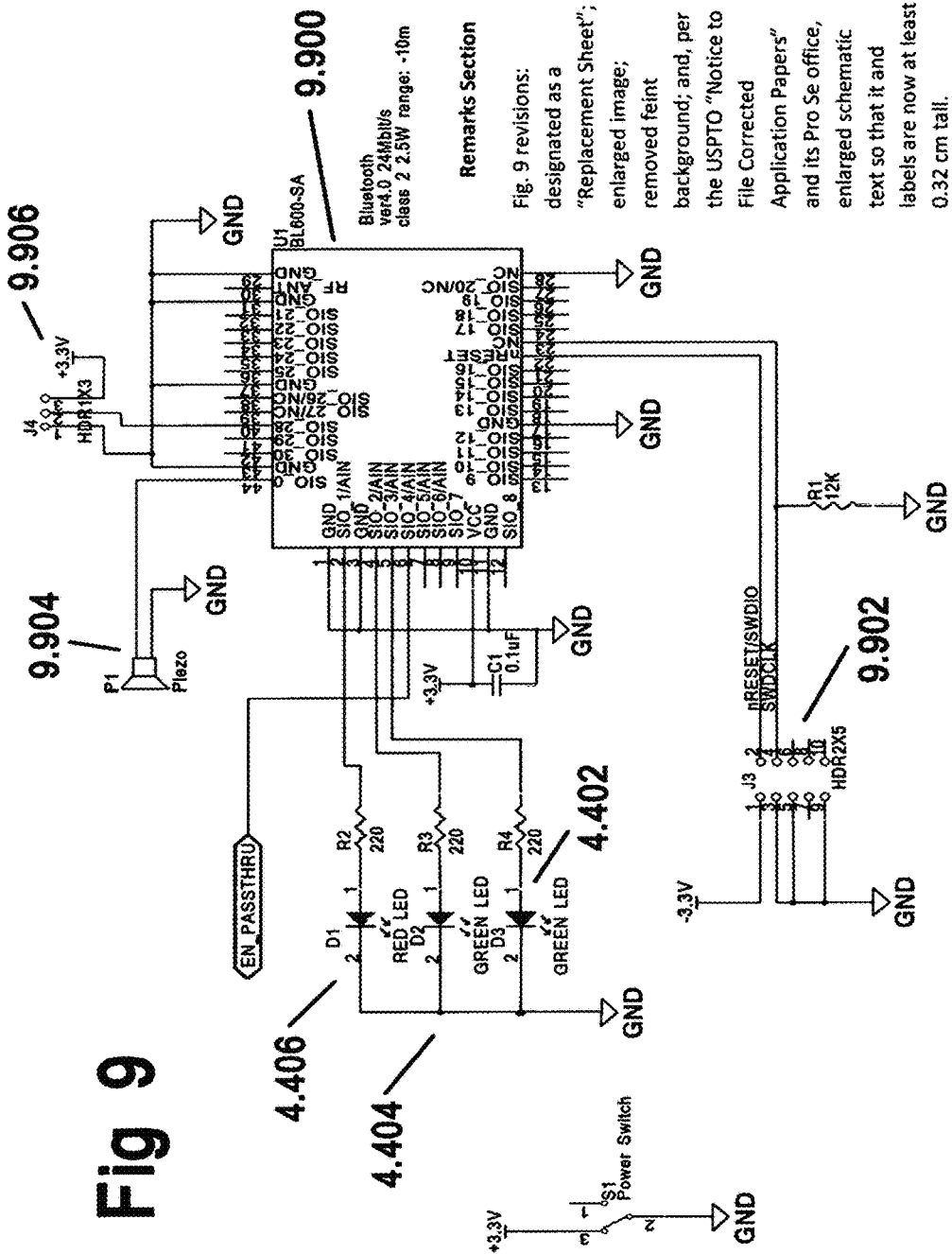

FIG. 9 is a continued detailed description of the electrical schematics of some embodiments' chassis.

Figure 10:
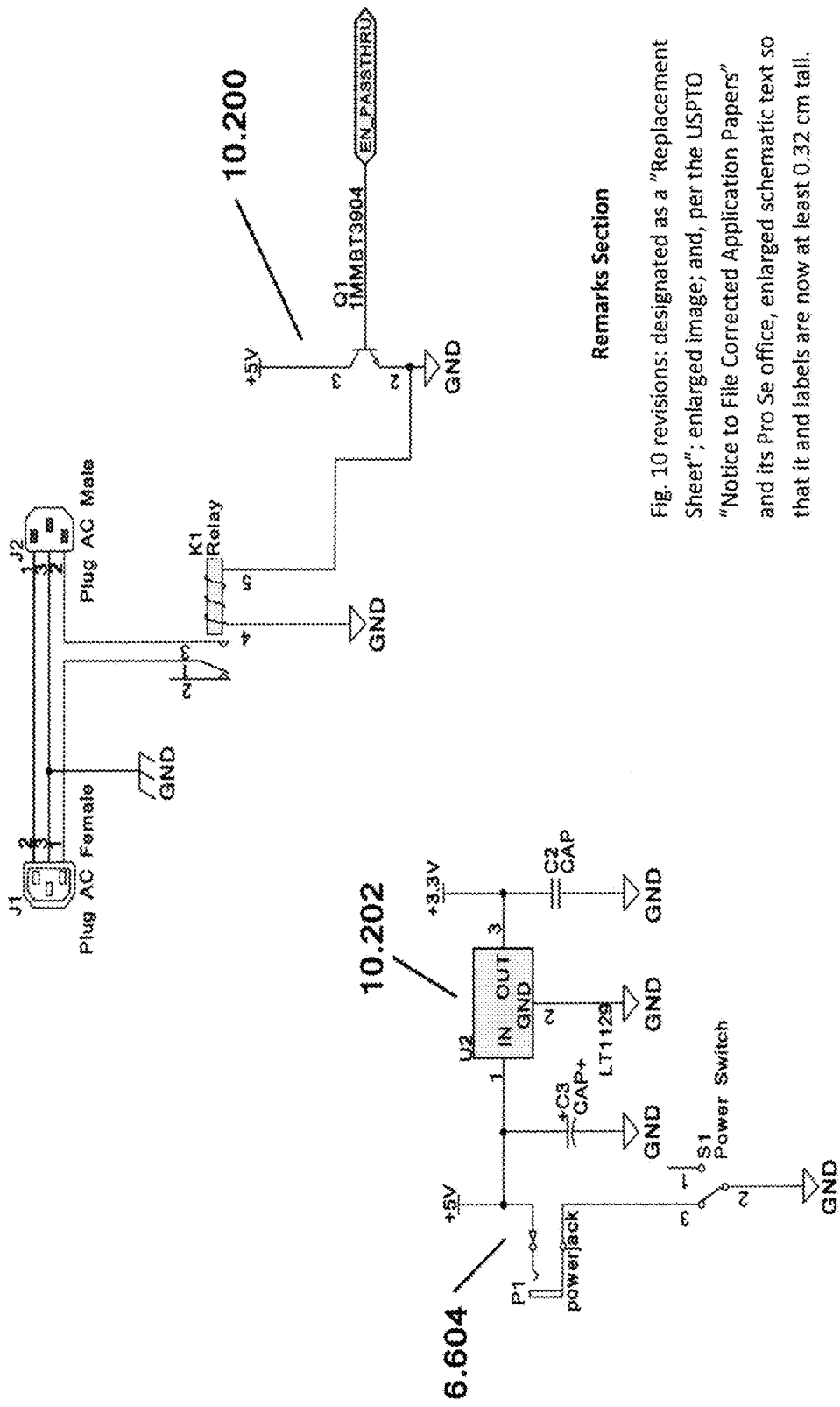

FIG. 10 is a continued detailed description of the electrical schematics of some embodiments' chassis.

Figure 11:
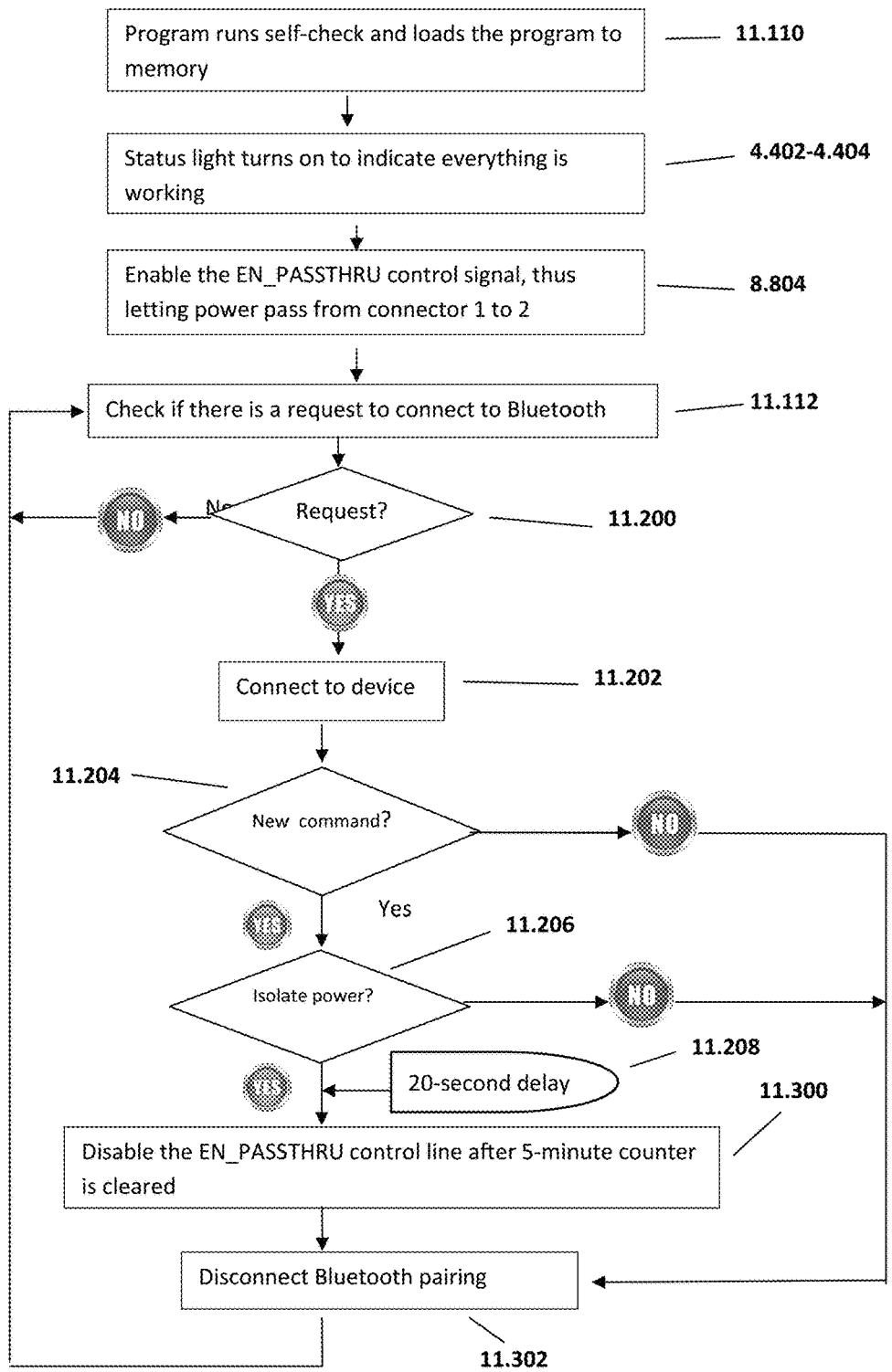

FIG. 11 is the process flow of the hardware chassis.

Figure 12:
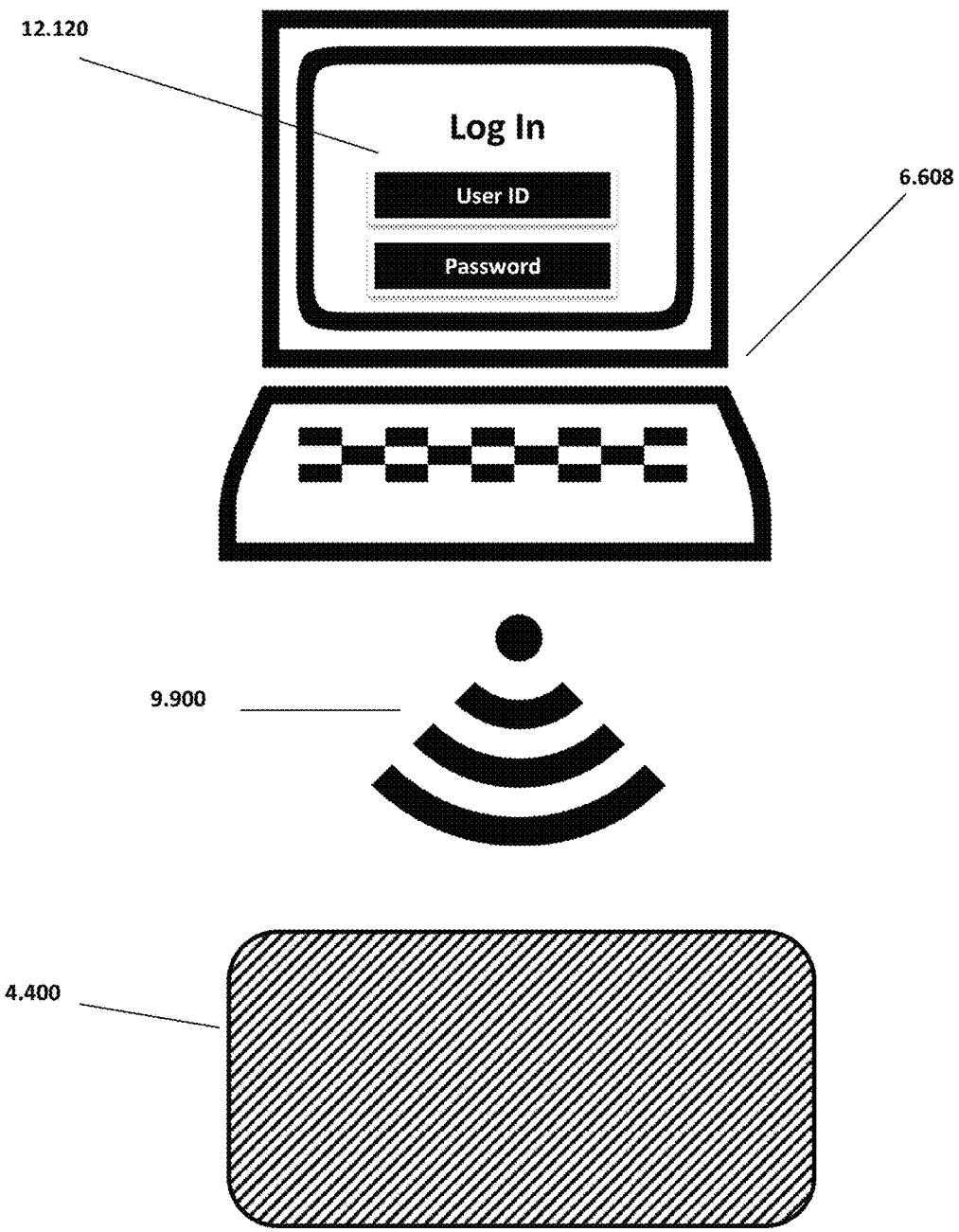

FIG. 12 is a further embodiment.

Figure 13:
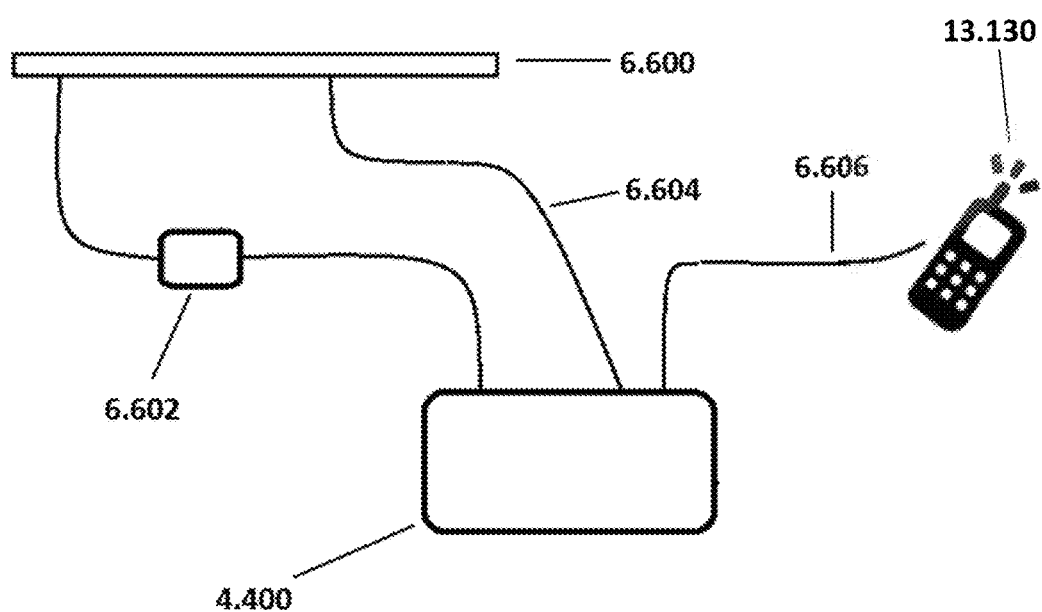

FIG. 13 is a further embodiment.

Figure 14:
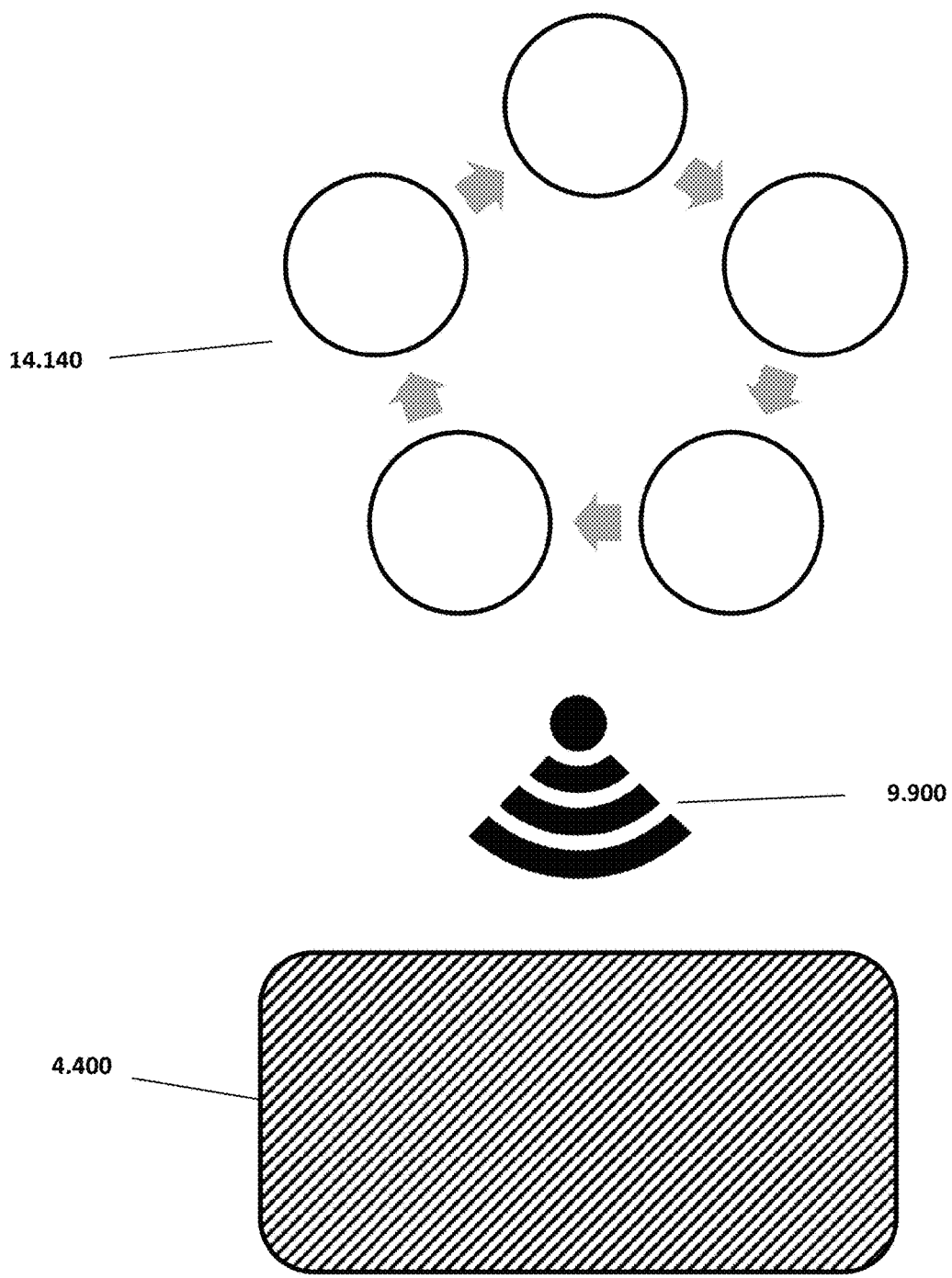

FIG. 14 is a further embodiment.

Figure 15:
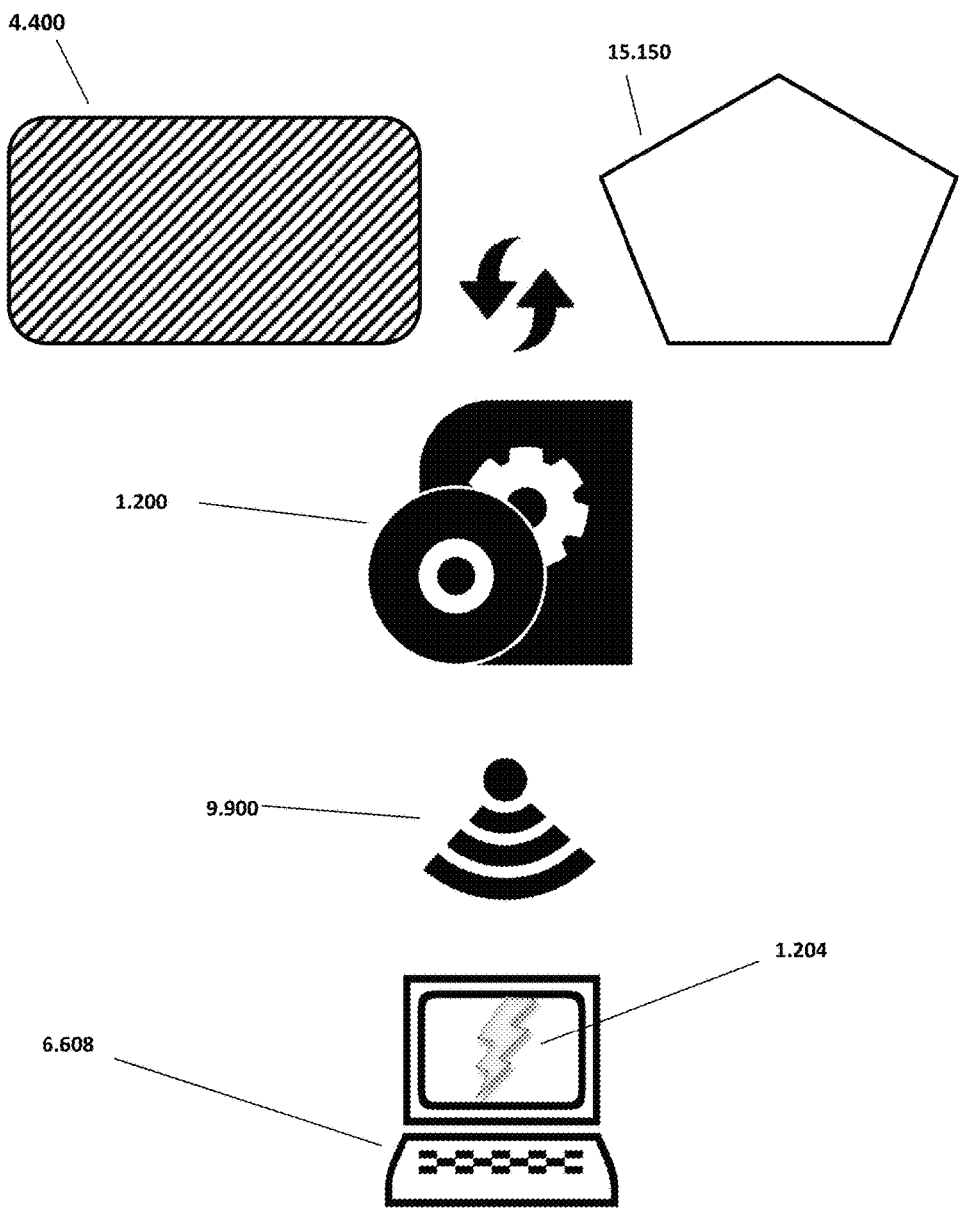

FIG. 15 is a still further embodiment.

Figure 1:
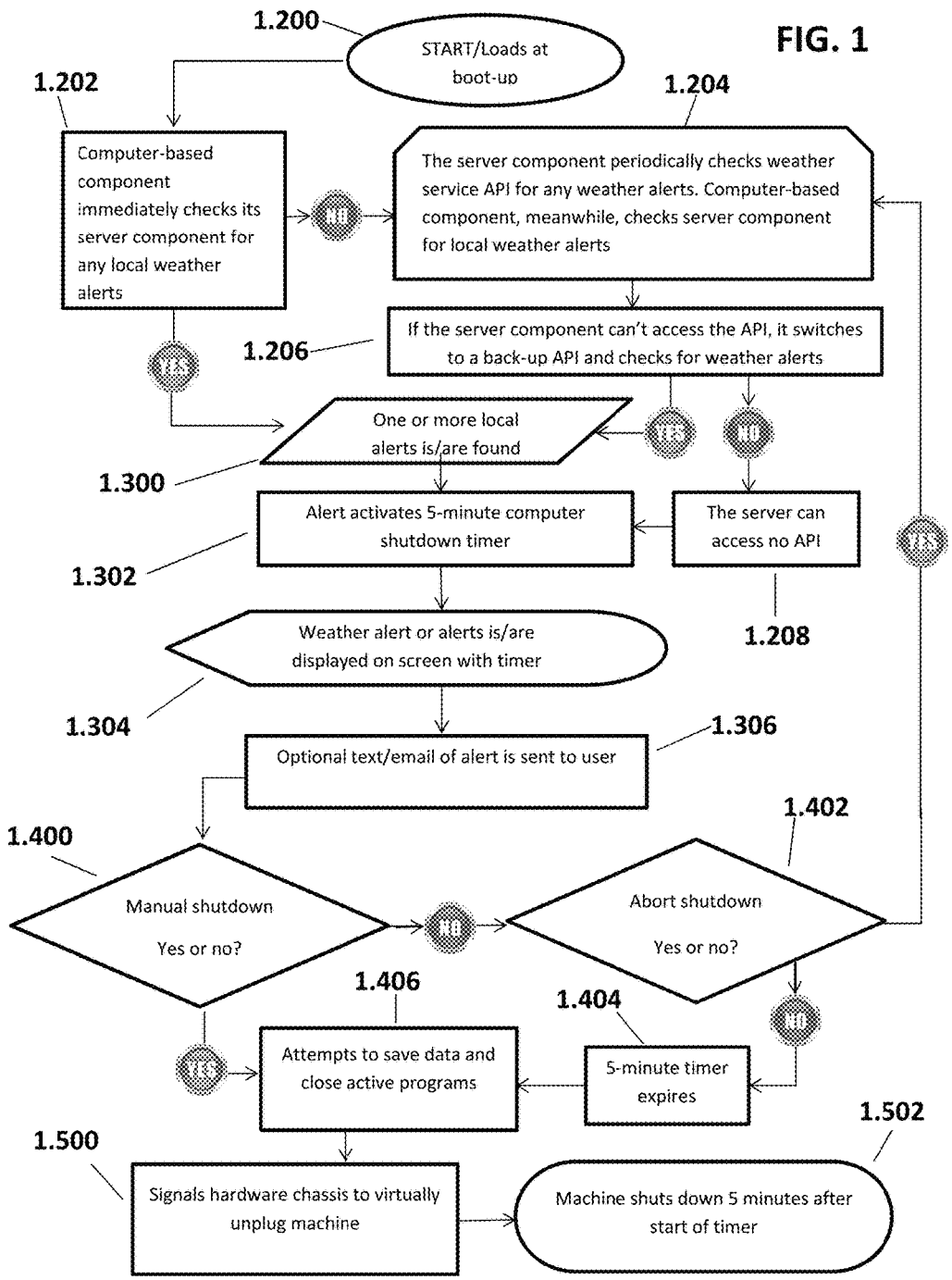
FIG. 1 is a process flow of some embodiments.

| Drawings-Reference Numbers | |
|---|---|
| Reference Number | Description |
| FIG. 1-Software Process Flow | |
| 1.200 | Software Application loads at computer boot-up |
| 1.202 | Computer-based component immediately checks its server component for any weather alerts for user's location |
| 1.204 | While program is in computer memory, its server component checks weather-service |

Drawings-Reference Numbers

| | |
|---|---|
| | server periodically (e.g., once every 5 minutes) for any weather alerts. Computer-based software component, meanwhile, checks its server hub component for local alerts at the same intervals |
| 1.206 | If server component cannot access the weather service server during one of its checks, it switches to a back-up weather service |
| 1.208 | If no weather service is found, the shutdown timer in FIG. 1.302 is started |
| 1.300 | One or more local alerts is/are found |
| 1.302 | Alert activates a shutdown timer or counter |
| 1.304 | Weather alert or alerts is/are displayed on screen with timer |
| 1.306 | Optional text/email of alert is sent to user |
| 1.400 | Manual shutdown - yes or no? |
| 1.402 | Cancel shutdown - yes or no |
| 1.404 | Value in counter or timer is reached |
| 1.406 | A second counter or timer enables a delay before actual shutdown to allow computer operating system to attempt to save any open work and to close any active programs |
| 1.500 | Signals hardware chassis to disconnect power to the computer |
| 1.502 | Computer shuts down |
| FIG. 2-Weather Codes of Sample Weather Service API | |
| 2.200 | Response Fields for cities within the USA |
| FIG. 3-Software Application Server Component Overview | |
| 3.200, 3.202, 3.204 and 3.206 | Example Users A, B, C and D |
| 3.300 | Software application's server or hub |
| 3.400 | Weather service server |
| 3.500 | Software application server/hub periodically checks weather service for weather alerts |
| 3.502 | The software application server/hub releases weather alerts to users |
| FIG. 4-Front View of the Chassis | |
| 4.400 | Chassis |
| 4.402 | LED power on/off status light |
| 4.404 | LED working status light |
| 4.406 | LED trouble status light |
| 7.700 | Control Circuit |
| FIG. 5-Rear View of the Chassis | |
| 4.400 | Chassis |
| 5.500 | AC output source |
| 5.502 | AC input source |
| 5.504 | DC input (+5 V) where an AC adapter plugs in to provide power to the circuit |
| FIG. 6-Perspective of the Chassis | |
| 4.400 | Chassis |
| 6.600 | Wall outlet or available surge suppressor |
| 6.602 | Optional Adapter supplying +5 V to the chassis |
| 6.604 | AC power cord to the chassis |
| 6.606 | AC power cord that connects the chassis to the computer |
| 6.608 | Computer with Wi-Fi or Bluetooth |
| FIG. 7-Perspective of Chassis Circuit | |
| 7.700 | View of the control circuit housed in chassis |
| FIG. 8-Details of Chassis Electrical Schematics | |
| 6.604 | AC power cord to the chassis |
| 6.606 | AC power cord that connects the chassis to the computer |
| 8.800 | AC cord's standard earth-ground cable connecting to the chassis |
| 8.802 | Relay that controls flow of power from chassis to computer |
| 8.804 | Enablement of EN_PASSTHRU control signal that lets power pass from chassis to computer |

Drawings-Reference Numbers

| | |
|---|---|
| FIG. 9-Details of Chassis Electrical Schematics, Continued | |
| 4.402 | LED power on/off status light |
| 4.404 | LED working status light |
| 4.406 | LED trouble status light |
| 9.900 | Receiver circuit |
| 9.902 | Programming port that accesses the circuit |
| 9.904 | Buzzer that sounds an audible alert warning of an imminent computer shutdown |
| 9.906 | Wi-Fi or Bluetooth configuration jumper; developer configuration settings used only for testing |
| FIG. 10-Details of Chassis Electrical Schematics, Continued | |
| 10.200 | Transistor that enables the relay if a Bluetooth chip is used |
| 10.202 | Regulator chip that provides power to enable the relay and optional Bluetooth chip |
| 6.604 | AC power cord to the chassis |
| FIG. 11-Process Flow of Chassis | |
| 11.110 | Chip programming runs a self-check and loads program into wireless receiver memory |
| 4.402-4.406 | LED indicates system is functioning/system status |
| 8.804 | Enablement of EN_PASSTHRU control signal that lets power pass from connector one to two of the chassis' two AC plugs |
| 11.112 | Polls the software application for a wireless connection request or shutdown signal |
| 11.200 | If no signal is detected, the system waits for a connection request |
| 11.202 | If a signal is detected, the wireless receiver connects to the computer |
| 11.204 | If no such wireless signal is received, the wireless pairing is disconnected |
| 11.206 | If the chip receives a wireless signal from the software application to disconnect power to the computer, it switches the relay open |
| 11.208 | The relay open switch occurs after a 20-second delay |
| 11.300 | EN-_PASSTHRU control line cuts the flow of voltage to 0 V, disconnecting power to the computer |
| 11.302 | The wireless pairing is disconnected |
| FIG. 12-Further Embodiments | |
| 4.400 | Chassis |
| 6.608 | Computer |
| 9.900 | Wireless connection |
| 12.120 | Web-based software application |

| Reference Number | Reference Number |
|---|---|
| FIG. 13-Further Embodiment | |
| 4.400 | Chassis |
| 6.600 | Wall outlet or available surge suppressor |
| 6.602 | Adapter supplying +5 V to the chassis |
| 6.604 | AC power cord to the chassis |
| 6.606 | AC power cord that connects the chassis to the computer |
| 13.130 | Mobile phone |
| FIG. 14-Further Embodiment | |
| 4.400 | Chassis |
| 9.900 | Wireless connection |
| 14.140 | Network of computers |
| FIG. 15-Still Further Embodiment | |
| 4.400 | Chassis |
| 6.608 | Computer |
| 9.900 | Wireless connection |
| 15.150 | Incorporating conventional surge suppressor into chassis |

DESCRIPTION

FIG. 1 shows a process flow of some embodiments, a software desktop application for Windows and Mac computers, using a programming language compatible with both operating systems. One such example is Adobe Air.

FIG. 2 shows an example of weather alerts for a weather-service application program interface (API) that some embodiments of the software application use to obtain real-time weather data. An example is presently available at: http://www.wunderground.com/weather/api/d/docs?d=data/alerts&MR=1

Some weather-service APIs provide national weather data, others provide global weather data. Some embodiments of this software application may use one or more national and global weather services to ensure redundancy of data availability in case a primary weather service stops working temporarily or permanently.

FIG. 3 shows a software application for users and a cloud-based component application (FIG. 3.400) that accesses one or more weather-service APIs.

In accordance with FIG. 3, the software application is implemented in a hub-and-spoke system to reduce the load on weather service servers.

Since the primary medium for contemporary weather service alerts is the internet, this invention uniquely overcomes the problem of usage restrictions imposed by many, if not all, weather services, regardless of whether they are commercially or government operated. For instance, even the U.S. government's National Weather Service (NWS) limits hits to its servers in its application program interface (API) or TOS. Weather services limit hits to their servers by weather applications to avoid overloading them and slowing down delivery of the weather data the servers provide. Exceeding the maximum usage may result in additional fees to users, or penalties such as usage restrictions or even a terminated account. This invention uses a cloud component that does all polling for weather alerts. It then passes along weather alerts only to those computers in the areas affected by the alerts.

Instead of potentially thousands implementations of the present invention overloading the weather service services via direct polling for alerts by all the implementations, a cloud-based hub enables that only the hubs poll for alerts, which alerts may be distributed to a network of the implementations via spokes. In one embodiment, the cloud component polls the weather alert servers once every five minutes by default so as not to miss any alerts for fast-moving weather systems, and the present invention, installed on individual computers and/or chassis, then polls the cloud component every five minutes by default for any local weather alerts. This hub-and-spoke polling system elegantly minimizes bandwidth and weather service server usage, thereby avoiding weather service restrictions, fees, and penalties.

In one embodiment, a software application contains a user interface that includes a preferences menu, where users can enter their location. The location may be a street address, zip code, county, or Global Positioning Satellite (GPS) coordinates, if compatible with the selected weather-service API.

Some embodiments of the software application, via the preferences menu, allows users to choose a primary weather-service APIs and one or more back-ups, in case the default or selected service is temporarily down. They may also choose select a default language, such as English, French, Spanish, Chinese, Japanese or Arabic.

If a hub cannot access a weather service, the present invention may switch to a back-up service (FIG. 1.206). If no weather service is available (FIG. 1.208), the present invention interprets this as the loss of internet service in a storm and automatically starts a shutdown timer or counter in FIG. 1.302.

In other embodiments, there may be a default or primary weather service, along with one or more default back-ups, or no back-ups, eliminating user selection of weather services.

A preferences menu also may allow users to choose some optional weather events (FIG. 2.200) that trigger a shutdown of their machines (FIG. 1.502). For instance, if users A and B (FIGS. 3.200 and 3.202) live near a large body of water, they may want the program to check for maritime-related alerts, if available from the API in use. Similarly, users C and D (FIGS. 3.204 and 3.206) that live along the Gulf Coast may opt for hurricane warnings, if available from the weather service in use.

FIGS. 4 and 5 are front and rear views of a chassis used to implement one or more parts of the present invention (FIG. 4.400). The chassis can include exterior status lights (FIGS. 4.402-4.406), AC input and output sources (FIGS. 5.500-5.502) and a DC input (FIG. 5.504).

FIG. 6 shows a perspective of some embodiments of the chassis, made of plastic with an integral or modular case design. In one embodiment, it contains a control circuit (FIG. 7) with receiver technology (FIG. 9.902).

FIGS. 8, 9 and 10 provide a detailed breakdown of electrical schematics and components of the chassis.

FIG. 6 shows a conventional AC power cord connecting the chassis to a wall outlet or available surge suppressor, and a second conventional AC power cord connecting a computer to the chassis.

In more detail, FIG. 10 shows the conventional AC power cord plugging (male) into a wall outlet or available surge protector (female receptacle), and connecting with the chassis. Per FIG. 10, a second conventional AC power cord of the computer plugs (male) into a female receptacle on the chassis.

In some embodiments, instructions embodied in software or firmware are executed by a processor in functional communication with a control circuit in the chassis (FIG. 9.900) with the purpose of shutting down (FIG. 1.502) and then disconnecting (FIG. 11.300) a computer device from its power supply some period of time after a local weather alert (FIG. 1.300) is received. As determined by a timer or counter, before the chassis disconnects the computer from the power supply, the instructions initiate a shut down the computer. In one embodiment the instructions are stored in a separate memory or on a processor that executes the instructions. In one embodiment the memory resides in the device connected to and protected by the present invention, for example, as part of a program installed on a computer being protected. In another embodiment, the instructions reside on the chassis.

In the preferences menu of the software application, a user may choose optional types of weather events (FIG. 2), to activate a shutdown. For instance, a user living near a lake or ocean may want the program to check for maritime-related alerts, if available in the weather service used. Default or mandatory weather events include tornado watches and warnings, and severe thunderstorm warnings. As a convenience to users, a software user interface may include a slider with Minimum, Medium and Maximum security settings. The Minimum setting provides default weather alerts (e.g., flooding, thunderstorms, and tornados); the Medium setting includes about half of the weather service's available alerts; and the Maximum setting brings in all available alerts. Additionally, each available alert may have its own check box. Users may broadly choose which weather alerts to receive by adjusting the slider. For more granular control, users may select or de-select individual checkboxes.

If the cloud-based component of the program cannot access the weather service used, it switches to a back-up service (FIG. 1.206). If none is available (FIG. 1.208), the computer-based program activates a countdown timer or counter (FIG. 1.302).

In some embodiments, at boot up, the program instructions immediately cause a receiver to check a cloud hub component, (FIG. 1.202), for any new weather alerts for the user's location. Upon the detection of a local weather alert, the instructions activate a countdown timer or counter in FIG. 1.302. If it finds no alerts, the program periodically (e.g., every 3 to 10 minutes) checks for local alerts while running in the background (FIG. 1.204). Users may adjust polling frequency in one-minute increments within a minimum (for example, every 3 minutes) and maximum (for example, every 10 minute) limits.

Meanwhile, the cloud hub component (FIG. 3.300) periodically checks a weather service (FIG. 3.400) for the local weather alerts (FIG. 3.500).

The cloud hub component only delivers local weather alerts to affected computers (FIG. 3.502), based on locations configured by their users during set-up of the software application.

When the computer (FIG. 6.608) is running normally and there are no local weather alerts, control of the chassis (FIG. 4.400) allows power to flow from the wall outlet or optionally an in-line surge suppressor to the computer.

The chassis connects to a wall outlet or (FIG. 6.600) via a conventional AC plug, which includes an earth-ground cable (FIG. 8.800), and electrical cord (FIG. 6.604). The computer's AC cord plugs (FIG. 6.606) into the chassis.

In embodiments, weather alerts are received by a receiver wirelessly via Wi-Fi, Bluetooth, and/or over conventional frequencies such as broadcast by NOAA over the VHF band. Weather alerts received over VHF enables weather alerts to be received when Wi-Fi or Bluetooth signals are disabled or not available. In one embodiment, a chassis includes a programming port (FIG. 9.902) that can used to download programming instructions; and a configuration jumper with developer settings used for testing purposes (FIG. 9.906). An optional DC adapter (FIG. 5.504). may provide power to a control circuit of the chassis (FIG. 7.700).

FIGS. 4.402, 4.404 and 4.406 show the LED's power on/off; working; and trouble statuses, respectively.

FIG. 5.500 shows the AC output source; FIG. 5502 shows the AC input source; and FIG. 5.504 shows the DC input (+5V), where an AC adapter plugs in to provide power to the chassis.

In one embodiment, the present invention includes a surge protection built into the chassis that protects devices during non-weather related events. A separate or stand-alone surge protector is included to show how it could work with this invention. FIG. 6.602 shows the adapter supplying +5V to the chassis.

In further detail, FIG. 11 represents an embodiment where instructions cause polling of a cloud based hub component until a weather alert signal is received by a receiver from the hub. If the receiver receives a weather alert, the instructions communicate with the control to cause a switch to disconnect a device being protected from its power source.

In one embodiment, when a receiver receives one or more local weather alerts (e.g., tornado watch or thunderstorm warning) from its cloud-based companion program, the instructions starts a 5-minute countdown timer (1.302) to shut down (FIG. 1.502) and then disconnect (FIG. 11.300) the computer from the power supply.

In one embodiment, a timer value appears on the computer's screen or monitor, along with the one or more local weather alerts (FIG. 1.304) that triggered the shutdown timer. If the user is present, he or she may shut down (FIG. 1.400) the computer immediately or cancel the shutdown (FIG. 1.402) before the 5-minute mark by pressing one of the two buttons, as appropriate, which appear on the computer screen with the timer. Otherwise, an optional text or email (based on user Preferences) is sent to the user (FIG. 1.306) as the countdown continues.

Just before shutting down the computer with the expiration of the timer (FIG. 1.404), one embodiment of the present invention implements a delay determined by a second timer (for example, 20 seconds) to allow the computer device operating system to attempt to save any open work and close any active programs (FIG. 1.406). Then it wirelessly signals (FIG. 1.500) the chassis to disconnect the computer (FIG. 11.300) from the power supply. The disconnection occurs in the chassis.

After receiving a power-down signal, the instructions are configured to wait a number of seconds (FIG. 11.208) before instructing the control disconnect power to the computer. The delay may be adjusted up or down programmatically or by a user.

Optionally, a buzzer (FIG. 9.904) connected to the chassis sounds moments before the computer shutdown. The buzzer may be designed to alert the computer user, if present, of the imminent computer shutdown, and to give the user the option of immediately shutting down the computer or canceling the shutdown.

Electrical power to the computer is disconnected via an internal switch. A switch is shown by FIG. 8.806, which is intended to represent interruption of delivery of electrical power at the three power lines at the one or more power output of the chassis. FIG. 8.802 is representative of how the interruption can be effectuated, mainly by a relay that is configured to withstand high voltage arcing across its contacts when they are in an open/disconnected position. Each of the power lines can thus be configured to control power to flow from the chassis to the computer or other electrical device when the relay is closed (FIG. 8.804) and, conversely, to interrupt power and isolate a connected computer or device from line power when the switch is opened, for example by an EN_PASSTHRU signal generated by a receiver configured to receive signals indicative of a weather alert, whether directly or from the connected computer or device. In embodiments, signals indicative of weather alerts can be embodied in Wi-Fi, Bluetooth, VHF or other frequencies known in the art.

In more detail, FIG. 8.804 shows some embodiments enabling of the EN_PASSTHRU control signal that lets power pass between a pair of connectors of the chassis' two AC plugs—one connecting the chassis to a wall outlet or available surge suppressor and the second connecting the chassis to the computer. To cut power to the computer, flow of voltage is cut from +3V to 0V or ground, collapsing the magnetic field and forcing the relay of the switch open. In as much as power supplied by the chassis to devices outside the chassis is interrupted by the relay at the output of the chassis, all power supplied within the chassis can continue to be provided since the power will be isolated from any devices conned to the chassis. An example of such power that can remain active is the 5v supplied to the chassis through the optional adapter.

In one embodiment, the relay is designed to be reset to its default position of closed, allowing power to pass through, when reset by a user or automatically through a software cloud-based component.

Further embodiments are shown in FIGS. 12-15. FIG. 12 shows web-based software/instructions (FIG. 12.120), on a Wi-Fi enabled computer, communicating (FIG. 9.900) with the chassis (FIG. 4.400). However, even web-based software still would require a software component installed on the chassis or user's computer to control the shutdown process.

FIG. 13 is, in further embodiments, a software application for mobile devices (FIG. 13.130) such as Apple iPhones and Android smartphones, using IOS and Android programming, respectively. Currently, Apple's IOS does not allow external applications to turn off its mobile devices, but the present invention's chassis can disconnect power from such mobile devices while they are connected, or plugged into, the chassis.

FIG. 14 is, in still further embodiments, a software enterprise application for a computer network.

FIG. 15 shows a chassis that incorporates a conventional surge suppressor (FIG. 15.150) and the software application, housed on the computer, in some embodiments.

In FIG. 12, web-based software (FIG. 12.120), in still further embodiments, may incorporate aspects such as user log-in to a central membership website. There, users could maintain and change preferences and account settings. A web-based program could be programmed in several languages, such as Java or C++.

In FIG. 13, according to further embodiments of a software application for mobile devices (FIG. 13.130), the user's GPS-enabled smartphone may be used to pre-populate his or her location in the Preferences area of the software application.

In FIG. 14, in one embodiment, a software application of according to the present invention is installed on a computer network (FIG. 14.140) in lieu of individual computers.

In FIG. 15, a chassis is modified in further embodiments to incorporate a conventional surge suppressor (FIG. 15.150) containing one or more AC female receptacles where power cords for computers and other electronic devices are plugged in. In embodiments, devices protected by the chassis include, but are not limited to, printers, cordless, multiple-handset telephones, smart TVs, home entertainment centers, air conditioners, and other appliances and utilities.

In one embodiment in FIG. 15, instructions (FIG. 1.200) are implemented in memory in the chassis rather than a device being protected. In one embodiment, the instructions wait for weather alerts received by a receiver on the chassis. In another embodiment, the receiver may be implemented on the device being protected by the present invention.

In still further embodiments, controlling software includes an option of just turning off each device (computer and appliances) but not disconnecting them from the power supply, and another option to turn the computer back on automatically through Wake on LAN technology, in conjunction with the present invention software's cloud-based component and the hardware chassis' capability of allowing electrical power to automatically pass through to the computer. These options could be available in this invention software's settings or Preferences. Wake on LAN technology allows a computer to be turned on remotely and automatically. In further embodiments, a mobile device application could be used with Wake on LAN technology, to turn the computer back on. Once the computer is turned back on, the process—which involves shutting down the computer, disconnecting power to it, and then reconnecting power and re-starting the computer—repeats until the severe weather leaves the area and no more alerts are triggered, or the user manually turns off the computer.

Thus the reader will see, in some embodiments, this combination software-hardware system proactively protects Windows, Mac and Linux desktop and portable computers while plugged into a wall outlet or available surge suppressor, from weather-related electrical problems.

Furthermore, the system provides remote, automatic protection to computers, appliances and entertainment devices, whether a user is present or not, thus prolonging their life.

The present invention has the potential to save homes and businesses money otherwise lost each year to countless lightning strikes and related electrical problems. Specifically, the system guards against data loss and hardware damage and destruction.

This system, in further embodiments, offers similar protection to mobile devices and computer networks.

The brief delay before the chassis shuts down a protected device, in some embodiments, can be increased or decreased, as needed for a smoother process of turning off the computer and disconnecting it from power.

Instead of obtaining weather alerts from one or more weather-service APIs, in further embodiments, such alerts may be available from internet weather stations.

The switch used in the chassis to disconnect power to user's devices, in still further embodiments, can be replaced with other devices known to be capable of electrically disconnecting and isolating devices from their source of power.

An optional email or text, warning users of an impending computer shutdown, in some embodiments, could be expanded to allow a user to remotely cancel the shutdown, or order an immediate shutdown, with a reply email or text recognized by the system.

The instructions, in some embodiments, may disable all sleep modes and similar modes (e.g., hybrid sleep on Windows computers) in Windows, Mac and Linux operating systems to allow for continuous periodic polling for weather alerts when the computer is in sleep mode while not in use. In further embodiments, users are directed to manually disabled sleep modes and any similar modes in their computer control panels. This process takes only a few minutes. Disabling sleep and similar modes is important because Windows, for instance, only allows some system utilities to operate at such modes as a power-saving function. The invention software may not function properly while the computer is in sleep mode or a similar mode.

In one embodiment, a battery power source may be used to power the chassis and its control circuits and/or devices connected to the chassis, such that functionality of the instructions, receiver, and control of the present invention can continue to function even after AC power from a wall source to the connected devices is disconnected by the chassis, for example, so that the termination of a weather alert can be detected by the receiver and so that the control can be instructed to once again provide AC power to the connected devices.

Thus, the scope should be determined not by the embodiments illustrated, but by the appended claims and their legal equivalents.

The invention claimed is:

1. A protection system for automatically protecting at least one electrical device from weather related events, the protection system comprising:
 one or more source configured to deliver AC voltage via a wired connection to at least one electrical device;
 a cloud-based weather service server periodically receiving weather information from a weather information service;
 at least one receiver located at a first location configured to receive a weather alert signal from the cloud-based weather service server
 at least one receiver located at a second location configured to receive a weather alert signal from the cloud-based weather service server,
 wherein the cloud-based weather service server is configured to provide weather alert signals to the at least one receiver located at a first location and the at least one receiver located at a second location, where the first location and second location are remote from each other,
 wherein the received weather alert signal includes data indicative of a weather event; at least one control functionally coupled to the one or more source and one or more of the receivers;
 a memory and a processor, wherein the control is functionally coupled to the processor and the memory, wherein the memory stores instructions, wherein the instructions are configured to cause the control to automatically disconnect the wired connection to the at least one electrical device after the receiver receives the weather alert data;
 a first timer configured to delay the disconnection of the wired connection by a period of time determined by a value.

2. The protection system of claim 1, wherein the value is determined by the data or a user of the at least one electrical device.

3. The protection system of claim 2, wherein the system further comprises a second timer, wherein the second timer is configured to initiate shutdown of the at least one electrical device before the period of time has elapsed.

4. The protection system of claim 3, wherein the shutdown of the at least one electrical device occurs before the period of time has elapsed.

5. The protection system of claim 4, where the system further comprises a switch configured to receive a signal from the control and to cause the disconnection of the wired connection.

6. The protection system of claim 5, wherein the at least one electrical device is selected from the group comprised of a computer, an appliance, and an entertainment device.

7. The protection system of claim 1, wherein the system further comprises a DC power source configured to provide power to the at least one control or the at least one electrical device during disconnection of the wired connection.

8. The protection system of claim 7, wherein the at least one control or the at least one electrical device is configured to automatically reconnect the wired connection to the at least one electrical device upon conclusion of the weather related event.

9. The protection system of claim 1, wherein the system further comprises a hub-and-spoke polling system, wherein the hub receives the weather alert signal from the weather service and distributes the signal to the at least one device so as to minimize weather service bandwidth and server usage by the at least one device.

10. The protection system of claim 1, wherein the weather event comprises a thunderstorm, a tornado, or a hurricane.

11. The protection system of claim 3, wherein the system comprises the at least one electrical device, and wherein the at least one device comprises at least one of the at least one receiver and the instructions.

12. The protection system of claim 3, further comprising a housing, wherein the housing is comprised of the receiver, the control, and the one or more source.

13. The protection system of claim 1, wherein the data is also indicative of a location of the weather event.

14. A method for automatically protecting at least one electrical device from weather related events, the method comprising the steps of:
 connecting at least one electrical device to one or more source of AC power via a wired connection;
 receiving a weather alert signal from a weather service with a cloud-based weather service server, the cloud-based weather service server periodically receiving weather information from a weather information service, the cloud-based weather service server configured to provide the weather alert signals to at least one receiver located at a first location and at least one receiver located at a second location, where the first location and second location are remote from each other,
 wherein the alert signal includes data indicative of a weather event and a location of the weather event;
 upon the receipt of the weather alert signal, waiting a period of time determined by a timer;
 after waiting the period of time, automatically disconnecting the wired connection between the at least one electrical device and the one or more power source.

15. The method of claim 14, further comprising a step of automatically shutting down the at least one electrical device before the end of the period of time.

16. The method of claim 15, further comprising a step of providing DC power to the at least one device after or at the time of disconnecting the wired connection.

17. The method of claim 16, further comprising a step of automatically reconnecting the wired connection to the at least one electrical device upon conclusion of the weather alert signal.

18. The method of claim 14, further comprising a step of receiving the weather alert signal from a cloud based hub and distributing the signal from the hub to the at least one electrical device so as to minimize weather service bandwidth and server usage.

19. A protection system for automatically protecting at least one electrical device from weather related events, the protection system comprising:
 one or more source configured to deliver AC voltage via a wired connection to at least one electrical device;
 a cloud-based weather service server periodically receiving weather information from a weather information service;
 at least one receiver located at a first location configured to receive a weather alert signal from the cloud-based weather service server; at least one receiver located at a first location configured to receive a weather alert signal from a the cloud-based weather service server;
 at least one receiver located at a second location configured to receive a weather alert signal from the cloud-based weather service server, where the first location and second location are remote from each other, wherein the received weather alert signal includes data indicative of a weather event and a location of the weather event;

at least one control coupled to the one or more source and one or more of the receivers, wherein the control is configured to automatically disconnect the wired connection to the at least one electrical device after the receiver receives the weather alert data:

a first timer configured to delay the disconnection of the wired connection by a period of time determined by a value; and a second timer, wherein the second timer is configured to initiate shutdown of the at least one electrical device before an end of the delay.

20. The protection system of claim 19, wherein the device further comprises a DC power source configured to provide power to the at least one control or at least one electrical device during disconnection of the wired connection; and wherein the control or at least one electrical device is configured to automatically reconnect the wired connection to the at least one electrical device upon conclusion of the weather related event.

* * * * *